3,291,754
MOLECULAR SIEVE FORMED BODIES HARDENED WITH A BINDING AGENT
Helmut Hanisch and Wolfgang Biedermann, Krefeld-Bockum, Germany, assignors to Farbenfabriken Bayer Aktiengesellschaft, Leverkusen, Germany, a German corporation
No Drawing. Filed Jan. 10, 1963, Ser. No. 250,483
Claims priority, application Germany, Feb. 19, 1962, F 36,069
5 Claims. (Cl. 252—455)

The present invention is concerned with molecular sieve formed bodies hardened with a binding agent and with the production thereof.

In order to ensure a sufficient form stability and attrition stability, the known molecular sieve formed bodies, which are used, for example, for the separation of hydrocarbon mixtures, are hardened by clay-containing materials, preferably bentonite. As a rule, the content of a binding agent of this kind in the formed body is about 30% by weight.

However, in some cases, this content of binding agent causes undesirable retention of impurities by the molecular sieves. This is particularly disturbing when the molecular sieves are to serve for the purest possible separation of certain components, for example, straight chain paraffins, from hydrocarbon mixtures in that these components are adsorbed by the molecular sieve formed bodies and are subsequently again eluted therefrom. The mentioned impurities thereby go into the eluate, even if the charged molecular sieve formed bodies are washed between the adsorption and desorption stage.

We have now found that oxides and hydroxides, as well as basic salts, all alkaline earth metal are outstandingly suitable as binding agents for molecular sieve formed bodies. These materials also bestow form stability and attrition stability without, however, possessing the disadvantage of holding, in an undesirable manner, impurities from the hydrocarbon mixtures and then again releasing them upon eluting.

As suitable alkaline earth metal oxides or hydroxides or basic salts, such as basic chlorides, sulphates and nitrates, there may be mentioned, for example, those of calcium, strontium and barium.

As molecular sieve powder, there can be used, for example, a so-called sodium molecular sieve with a pore diameter of about 4 A. and the pore diameter, after production of the formed bodies, increased by ion exchange to about 5 A. or, from the very beginning, there can be used for example, a so-called calcium molecular sieve with a pore diameter of about 5 A.

Expediently, there is first prepared an aqueous slurry of an alkaline earth metal compound of the type specified thus, for example, an alkaline earth metal oxide or hydroxide is dispersed in water or an aqueous solution of an alkaline earth metal salt, for example, of a chloride or nitrate, is mixed with a more or less large amount of an alkali metal hydroxide until a dispersion of the corresponding alkaline earth metal hydroxide or of a basic salt is formed. Alternatively a slurry of an alkaline earth metal oxide or hydroxide is mixed with so much acid that a dispersion of a basic salt is formed. Further, suitable amounts of an alkaline earth metal oxide or hydroxide may be combined with an alkaline earth metal salt in an aqueous medium.

Into the aqueous slurry of the alkaline earth metal oxide or hydroxide or basic salt there is then introduced molecular sieve powder in such an amount that the binding agent content of the solid material mixture accounts for about 5 to about 40 and preferably about 20 to about 30% by weight. The water content of the mixture is conveniently such that, upon homogenisation of the mixture, a brushable paste results. This paste is then moulded into the desired formed bodies, for example, by brushing the paste into a perforated metal sheet.

The paste is thereafter dried and moulded. If desired, the paste as such can also be dried, comminuted and sieved to the desired particle size and subsequently compressed. The drying can take place at room temperature or at elevated temperature of up to about 400° C., preferably between about 80 and 150° C.

Molecular sieve formed bodies so produced are particularly suitable for obtaining pure, straight chain paraffin from crude hydrocarbon mixtures, for example, mineral oil fractions, in known manner.

The following examples are given for the purpose of illustrating the present invention, the parts by weight and the parts by volume being in the relationship of grams to milliliters:

*Example 1*

300 parts by weight of calcium oxide powder are slowly stirred in 1000 parts by volume of dilute hydrochloride acid, with a content of 3.6 parts by weight of hydrogen chloride in 100 parts by volume, in such a manner that the mixture formed, after complete combination of the starting materials, shows an alkaline reaction. 1020 parts by weight of binding agent-free molecular sieve 4 A. are worked into this mixture with the addition of so much water that a brushable paste results. This is brushed on to metal sheets of 30 millimeters thickness with holes of 3 millimeters diameter. The filled metal sheets are left to stand for 60 minutes in a chamber, the temperature of which amounts to 120° C. After cooling, the dried formed bodies are removed from the metal sheet.

100 parts by weight of the formed bodies obtained are filled into a tube of 25 millimeters internal diameter and treated within 24 hours by the flowing through of a solution of 336 parts by weight of calcium chloride in 70,000 parts by volume of water in such a manner that, during this treatment, the formed bodies are continuously covered with liquid. Thereafter, the formed bodies are washed with 10,000 parts by volume of water, dried at 150–200° C. and finally completely freed from water at 300–350° C. under reduced pressure.

The formed bodies so produced from molecular sieve 5 A. show a surface area of 664 m.$^2$/g. and contain 0.45% by weight of sodium and 18.75% by weight of calcium.

*Example 2*

When working according to the procedure of Example 1 but with a difference that 820 parts by weight of barium oxide powder are used instead of 300 parts by weight of calcium oxide powder, then formed bodies are obtained with a surface area of 640 m.$^2$/g. and a content of 0.38% by weight of sodium.

*Example 3*

When working according to the procedure of Example 2 but with the difference that, instead of dilute hydrochloric acid there is used the same amount of water, then firm formed bodies are also obtained.

*Example 4*

230 parts by weight of crystalline calcium chloride with a content of water of crystallization of $6H_2O/CaCl_2$ are dissolved in 430 parts by weight of water. This solution is stirred with 215 parts by weight of sodium hydroxide dissolved in the same amount of water. If the mixture shows an alkaline reaction, then working up is further carried out according to the procedure of Example 1. The formed bodies finally obtained show the same properties as stated in Example 1.

Example 5

When working according to the procedure of Example 1 but with the difference that, instead of dilute hydrochloric acid, there are used 1000 parts by volume of dilute nitric acid, with a content of 30 parts by weight of nitric acid in 100 parts by volume, then there are also obtained firm formed bodies with a surface area of 500 m.$^2$/g.

Example 6

When working according to the procedure of Example 1 with the difference that, instead of dilute hydrochloric acid, a solution of 230 parts by weight of calcium chloride hexahydrate in 430 parts by weight water is first combined with the calcium oxide and then maintained for 2 hours with stirring before the molecular sieve powder is added, then firm formed bodies are also obtained.

Example 7

When working according to Example 1 with the difference that, instead of calcium oxide, the equimolar amount of calcium hydroxide is used, then firm formed bodies are also obtained.

We claim:

1. Molecular sieve formed bodies hardened with from 5 to 40% by weight of a binding agent selected from the group consisting of an oxide, hydroxide and basic salt of an alkaline earth metal.

2. Process for the production of molecular sieve formed bodies comprising dispersing a binding agent selected from the group consisting of an alkaline earth metal oxide, hydroxide and basic salt in water, introducing a molecular sieve powder into the dispersion in such an amount that the binding agent content of the solid material mixture accounts for about 5 to about 40% by weight thus forming a paste, moulding the paste and drying.

3. Process according to claim 2, wherein the amount of molecular sieve powder introduced is from about 20 to about 30% by weight of the solid material mixture.

4. Process according to claim 2 wherein the mixture of alkaline earth metal compound and molecular sieve powder is dried at a temperature of up to about 400° C.

5. Process according to claim 4, wherein the drying is carried out at a temperature between about 80 and 150° C.

References Cited by the Examiner

UNITED STATES PATENTS

| | | | |
|---|---|---|---|
| 2,865,867 | 12/1958 | Van Dyke et al. | 252—455 |
| 2,973,327 | 2/1961 | Mitchell et al. | 252—449 |
| 3,055,841 | 9/1962 | Gladrow et al. | 352—455 |

MILTON WEISSMAN, *Primary Examiner.*

OSCAR R. VERTIZ, *Examiner.*

E. J. MEROS, *Assistant Examiner.*